March 15, 1932.　　R. J. McLAUGHLIN　　1,849,943
AIRSHIP
Filed Aug. 17, 1931　　3 Sheets-Sheet 1
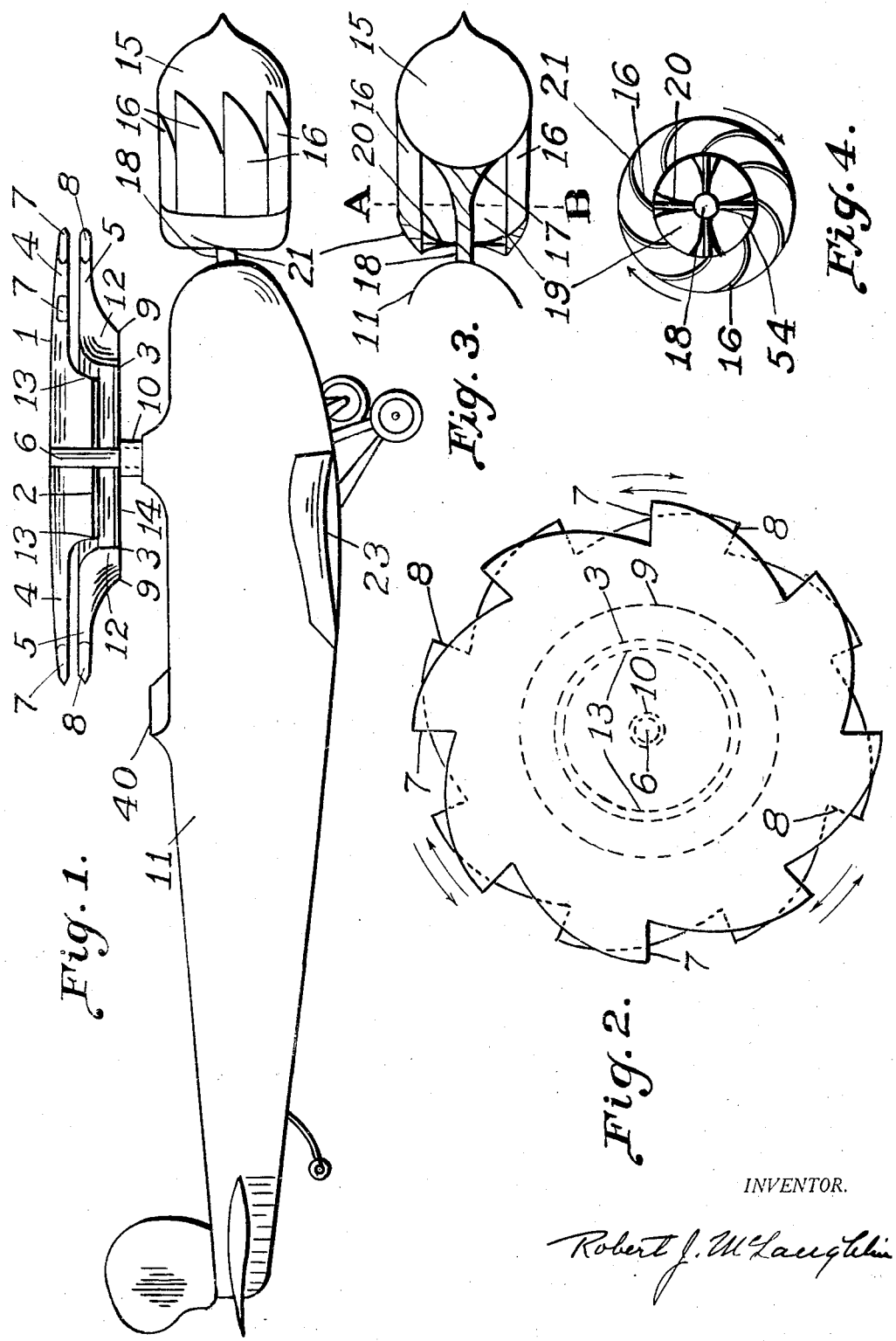
INVENTOR.
Robert J. McLaughlin March 15, 1932.    R. J. McLAUGHLIN    1,849,943
AIRSHIP
Filed Aug. 17, 1931    3 Sheets-Sheet 2

INVENTOR
Robert J. McLaughlin

March 15, 1932. R. J. McLAUGHLIN 1,849,943
AIRSHIP
Filed Aug. 17, 1931 3 Sheets-Sheet 3

INVENTOR
Robert J. McLaughlin
BY

Patented Mar. 15, 1932

1,849,943

UNITED STATES PATENT OFFICE

ROBERT J. McLAUGHLIN, OF MANHATTAN BEACH, BROOKLYN, NEW YORK

AIRSHIP

Application filed August 17, 1931. Serial No. 557,615.

My invention relates to the navigation of the air and to the operation of two flat wind wheels, resembling buzz-saws, with hollow teeth which draw in thin streams of air and convey them to the spaces inside the wheels which are devoid of all vanes or obstructing braces.

The air in these spaces is not rotated, but moves on straight paths to the centers of the wind wheels. One of these central spaces is circular and the other annular.

In them the air is compressed, and the compression drives it downward through the circular and annular vents, and the reaction to the downward motion furnishes the lifting force which thrusts the wheels upward.

The wind wheels revolve in opposite directions on concentric, vertical shafts which turn on ball bearings and are driven by gear wheels connected with the propeller, so that the wind wheels turn at one fourth the angular velocity of the propeller.

My invention also relates to a centripetal propeller with a globe shaped leading portion, and curving radial vanes, which drive the air into a central compression space, where it reacts against the rear surface of the globe, and is projected backward. The reaction to this backward motion thrusts the propeller forward.

My invention also relates to gear wheels provided with spiral springs which permit the motors to start at full speed, while the supporting wind wheels and the centripetal propeller begin turning with gradually increasing speeds.

After a short run the air ship will rise from the ground by means of the wind wheels and by the action of a low set plane. The gear wheels will be actuated by three motors, arranged around the concentric shafts.

The objects of my invention are: first, to provide effective lifting devices for the air ship; second, to employ an efficient propeller; and third, to furnish gear wheels capable of starting both the wind wheels and the centripetal propeller with a gradually increasing rotation until they turn at full speed.

Figure 5:
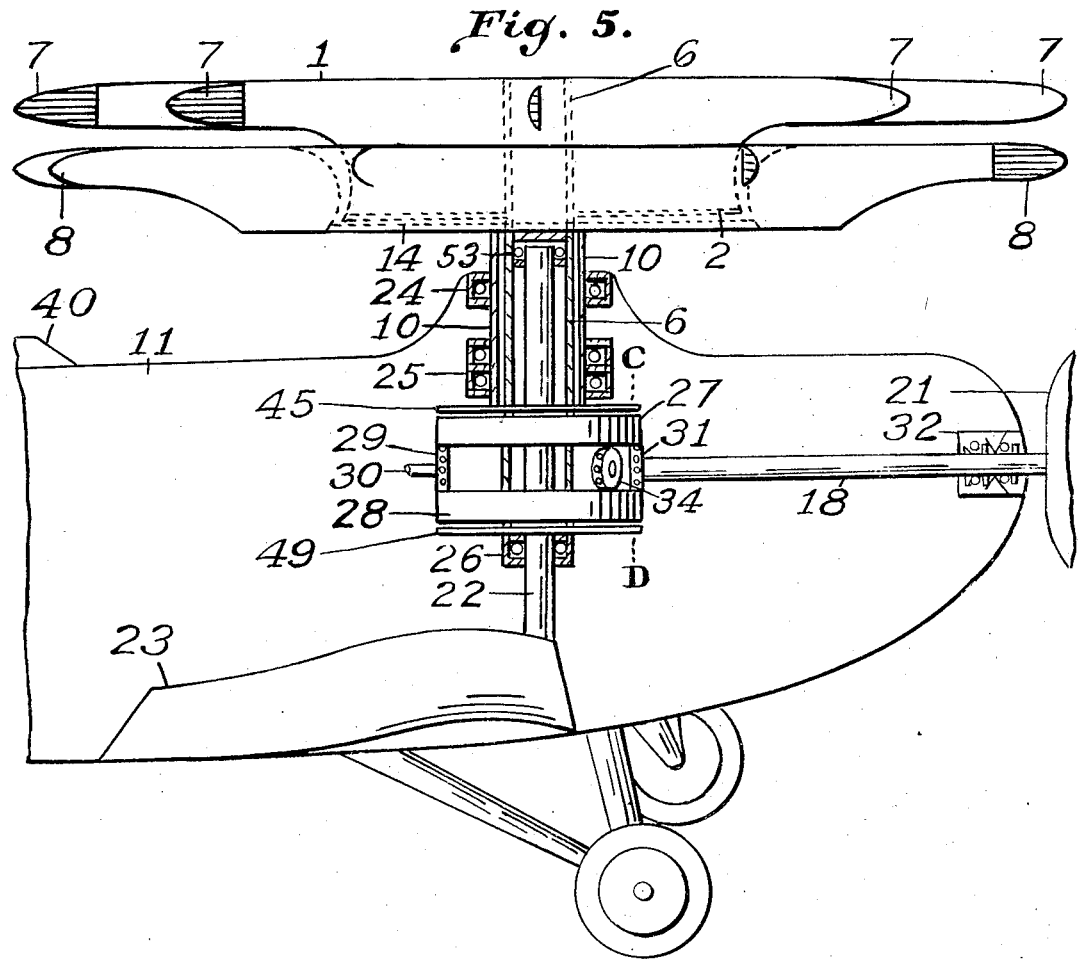
Figure 6:
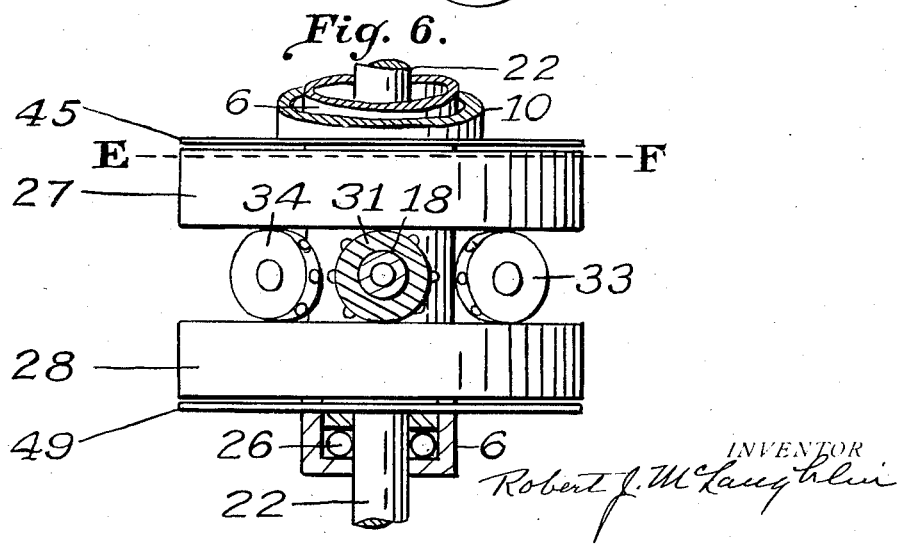
Figure 7:
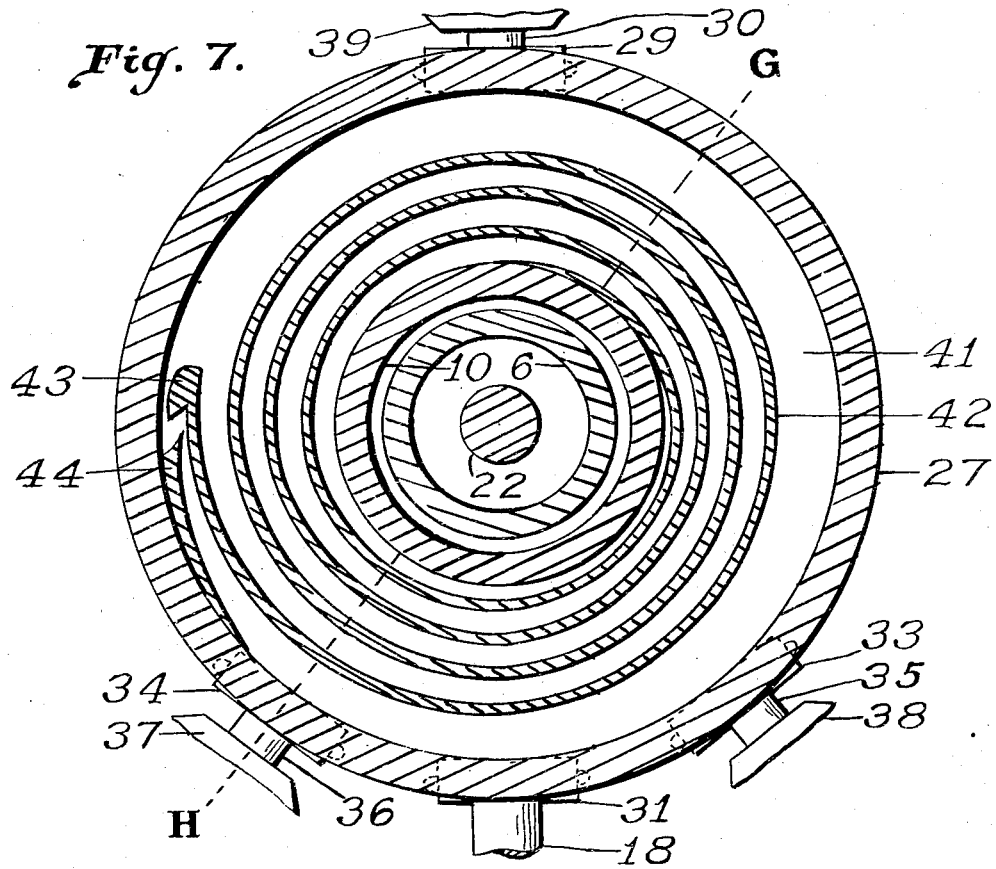
Figure 8:
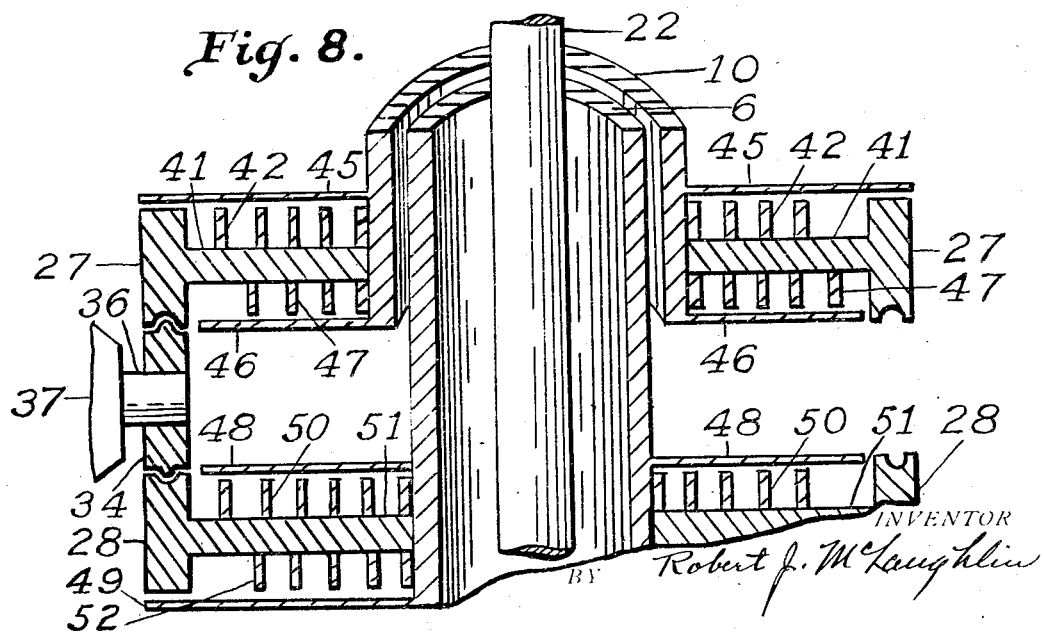

I attain these objects by the mechanism illustrated in the accompanying drawings, in which Fig. 1 is a side elevation of the air ship, partly in section; Fig. 2 is a top view of the wind wheels; Fig. 3 is a longitudinal section of the centripetal propeller; Fig. 4 is a cross section of the centripetal propeller, taken on the line A—B, Fig. 3, and looking backward; Fig. 5 is a side elevation of the forward part of the air ship. It is partly in section; Fig. 6 is a side elevation of the gear wheels, partly in section, and showing a section of the propeller cog wheel on the line C—D, Fig. 5; Fig. 7 is a horizontal section of the upper gear wheel, looking upward. It is taken on the line E—F, Fig. 6; and Fig. 8 is a cross section of the gear wheels and concentric shafts, taken on the line G—H, Fig. 7.

Similar numerals refer to similar parts throughout the several views.

A hollow metal shaft 6, Fig. 1, revolves in a similar shaft 10. The motion of shaft 6 when viewed from above the air ship is counter clockwise, while the motion of shaft 10 is clockwise.

Shaft 6 revolves on ball bearings 26 and 53 on a central, hollow metal shaft 22. It is rigidly connected to the upper wind wheel at the top surface 1, and at the supporting horizontal arms 2, Figs. 1 and 5.

Shaft 10 also revolves on ball bearings 24 and 25, set in the frame work of the air ship 11, Fig. 5, and is rigidly connected to the lower wind wheel at the supporting horizontal arms 14.

When the wind wheels are revolving the air enters the hollow saw teeth 7 and 8, Figs. 1, 2 and 5. The inner surfaces of these teeth are curved backward toward the centers of the wind wheels at apparent angles of incidence of about 38 degrees, but because of the circular motion of the curving tooth surfaces these angles of incidence are constantly lessened, and the drift pressure is not greater than that experienced by an air plane with an angle of incidence of 15 degrees. The lift pressure on the tooth surfaces is horizontal and carries the air on radial lines to the centers of the wind wheels in the hollow spaces 4, 5 and 12, Fig. 1, beyond the inner edges of the saw teeth 7 and 8.

The force of the entering streams of air is so great that all the air in the empty spaces inside the saw teeth of both wind wheels is compressed and from this compression a new motion is developed which carries the air downward through the annular vent of the lower wind wheel between the points 3 and 9, Fig. 1, and through the circular vent of the upper wind wheel between the points 13 and 13, Fig. 1.

The cross sectional area of each circumference vent may be 72 square inches, and the combined area of both the discharge vents may be eight times as great as the total cross sectional area of all the circumference vents on both wind wheels.

These wheels may be sixteen feet in diameter. The dimensions are relative and any change in the size of the wind wheels should affect all the dimensions equally.

The wheel surfaces will be composed of thin sheets of light, strong metal and thin steel wires will be used to resist the interior stresses. The horizontal supporting arms and such surface braces as may be required will be of hollow metal.

The motors will be located in the positions shown in Fig. 7 to balance the frictional strains on the shaft bearings. Three motors arranged in this way not only revolve the propeller shaft without using the central shaft bearings as a fulcrum, but they also equalize the frictional pressures on the shaft bearings caused by the rotation of the wind wheels.

Three water cooled motors of sixty horse power each, may be employed effectively.

The hollow metal globe 15, Figs. 1 and 3 of the centripetal propeller, is provided with a leading point and it opens a path in the air as the craft advances, and the air stream flows around to the curving vanes 16 which drive it into a compression area 19, Figs. 3 and 4.

The compressed air reacts against the surface 17, and is driven backward along the axis 18, through the circular hoop 21, and between the supporting arms 20.

The plane 23 is provided with ailerons and is set at a slight dihedral angle. Its object is to balance the drift of the wind wheels and to furnish a lift and a stabilizing influence.

The horizontal gear wheels 27 and 28, Figs. 5, 6 and 8, are free to revolve on the concentric shafts 6 and 10, though not free to slide up and down.

A fragmentary part of a motor 39 is shown in Fig. 7. This motor drives the cog wheel 29 which is rigidly fixed to the motor shaft 30, and is provided with semi-spherical cogs which mesh with the semi-spherical sockets set in the rims of the gear wheels 27 and 28, Fig. 5.

Directly opposite to the cog wheel 29 is the cog wheel 31 which is rigidly fixed to the propeller shaft 18 which revolves in the bearings 32.

Fragmentary portions of two diagonally arranged motors 37 and 38 are shown in Fig. 7. These motors drive the cog wheels 33 and 34, which are provided with semi-spherical cogs meshing with the semi-spherical sockets in the rims of the gear wheels 27 and 28, Fig. 8.

The motor shafts 35 and 36 are rigidly fixed to the cog wheels 33 and 34, Fig. 7.

The aviator sits inside the wind shield 40, Fig. 1.

The plate 41 of the upper gear wheel 27, Fig. 8, supports a freely sliding spiral spring 42. The inner end of this spring is fixed rigidly to the concentric shaft 10, while the outer end is provided with a sliding shoe 43. When the motor starts the gear wheel 27, the projecting point 44 on the inner rim of the wheel takes hold of the sliding shoe 43 and carries it around the shaft 10, tightening the spring as the rotation continues.

As soon as the spiral spring 42 begins to wind up, it exerts a rotating impulse on the shaft 10. This impulse grows stronger as the spring tightens, and when the winding process is finished the shaft 10 is fixed rigidly to the gear wheel 27 and turns with it. When the motors are stopped the spring 42 loosens up again and disconnects the shaft 10 and the gear wheel 27.

The plates 45, 46, 48, and 49 serve to keep the springs in position. The spiral spring 47 is similar to the spring 42, but its sliding shoe is caught by a projecting point on the opposite side of the gear wheel 27. This has the effect of balancing the strains on the bearings of the shaft 10.

The spiral springs 50 and 52 slide over the upper and lower surfaces of the plate 51. They are similar to the spiral springs 42 and 47, but as the gear wheel 28 revolves in an opposite direction to the gear wheel 27, the springs 50 and 52 wind up in a counter clockwise direction when viewed from above.

An interesting feature of the centripetal propeller is found in the flat blades 54, Fig. 4, which are attached to the supporting arms 20. These blades derive a rotary impulse from the air current driven by the heavy compression maintained in the interior of the centripetal propeller, and as they are a fixed part of the propeller they augment its rotation without in any way retarding its forward motion, since the action and reaction in the propeller itself are equal and opposite.

The outer ends of the blades 54 incline at an angle of about 45 degrees to the direction of the discharged current of air from the propeller. The air strikes the back of these blades and promotes their rotation.

Toward the axis of the propeller the blades decrease their angle of incidence to about 5 degrees to allow for their reduced speed near the axis. In this case the angle of incidence is measured to the back of the revolving blades.

If the velocity of the current of air driven by the propeller is less than the pitch distance per second of the revolving blades 54 they automatically become screw propellers and drive the current of air, passing through them, at an increased speed.

In moving forward with the air ship at high speed the air discharged in one second comes into contact with an air surface as wide as the vents but two or three hundred feet in length. The difficulty of penetrating this surface is greatly increased since the penetration depends upon the momentum of the volume discharged in one second, and upon the amount of air disturbed by the discharged current. The air cannot escape as fast when the air ship is moving as when it is standing still, and the upward lift from the compression of air in the wind wheels, above the discharge vents, reacts against the inertia of a much greater volume of air and not so much against the mass of the discharged current of air. Much of the lift is static, or a standing condition, and this eases up the strain on the power plant and makes possible an efficient flight.

Having described my invention what I claim is:

1. Oppositely revolving lifting wind wheels, turning on concentric shafts, and receiving an upward pressure during the horizontal flight of an air craft, in an air ship of the kind described, a centripetal, internal compression propeller, having a hollow, forwardly placed buffer globe, a pointed projection extending in front therefrom, an axial, circular discharge vent, an axial compression chamber, a reinforcing hoop, radial, curving vanes set laterally between the outer circumference of the said buffer globe and the said hoop, an axial shaft rigidly attached to a rear, stream line extension of the said globe, supporting arms rigidly attached to the axis shaft and the said hoop, and inclined propeller blades, attached rigidly to the said supporting arms, and serving as supplemental propellers, or as wind wheels revolving in the current of air discharged backward from the said compression chamber; horizontal gear wheels attached loosely to the said axis shafts, and made tight to the axis shafts by the action of spiral springs, cog wheels provided with semi-spherical cogs meshing with semi-spherical sockets in the adjacent rims of the horizontal gear wheels, and thus rotating them, motor shafts driving the cog wheels, spiral springs forming a bond between the said gear wheels and the concentric axis shafts, sliding shoes attached to the said spiral springs, pointed projections on the inner side of the rims of the said gear wheels, automatically connecting with the sliding shoes and thus winding up the spiral springs and binding the gear wheels to the concentric shafts when the motor cog wheels revolve the horizontal gear wheels, and convey to the wind wheels and to the centripetal propeller a gradually increasing velocity, substantially as described.

2. In an air ship of the kind described, consisting of oppositely revolving, lifting, wind wheels, flat, hollow air chambers, annular and circular discharge vents, spaces above the vents, serving for the compression of the air driven into the wheels through circumference vents, by virtue of their rapid rotation, and by virtue of the forward motion of the air ship, whereby the open vents scoop in the air and deliver it to the interior parts of the wind wheels; a series of hollow teeth on the rims of the wind wheels, said teeth having inner, horizontal, inclined surfaces, curving backwardly and inwardly from the direction of rotation, and serving as conduits to convey the air into the interior of the wind wheels; a flat upper surface extending over the upper wind wheel, a downwardly and inwardly curving lower surface, forming the bottom of the lower wind wheel; a circular space in the lower wind wheel for the accommodation of the discharge vent of the upper wind wheel; two oppositely revolving concentric shafts set vertically, or in a position approximately vertical, and extending above the air ship, horizontal arms extending from said concentric shafts, carrying flat wind wheels provided with hollow teeth on their circumferences, the said wind wheels resembling buzz-saws set one above another, and revolving in horizontal or approximately horizontal planes and in opposite directions; a centripetal, internal compression propeller geared to the said concentric shafts, a series of motors arranged around the horizontal gear wheels, driving them from the rear and from the front on both sides of the propeller shaft, in order to balance the frictional strains on the bearings of the said concentric shafts, substantially as described.

3. In an air ship of the kind described a pair of oppositely revolving wind wheels resembling buzz-saws, having hollow teeth with open vents which are driven against the air when the wind wheels revolve and when the air ship moves forward, and they thus scoop in the air and convey it to flat, axial, circular and annular compression chambers from which the air is discharged with two components of motion, one forward and horizontal and the other downward; a centripetal propeller consisting of a buffer, curving, radial vanes which advance laterally against the air and drive it into an interior compression chamber, a wind wheel rotated by the air current from the said compression chamber and acting as a supplemental propeller when the speed of the air current from the said chamber is less than the pitch distance per second of the said propeller; two oppositely rotating gear wheels with semi-spherical sockets set in adjacent sides of the wheels, cog wheels provided with semi-spherical cogs meshing with the sockets of the gear wheels; motors driving the said cog wheels and placed around the gear wheels in positions tending to balance the frictional strains on the bearings of the main concentric shafts, spiral springs set on the upper and lower surfaces of both gear wheels, attached to the said concentric shafts, winding and unwinding in opposite directions, in harmony with the motions of the gear wheels, exerting their pressure from opposite sides of each gear wheel to balance frictional strain in the bearings of the main concentric shafts and held in place against the upper and lower surfaces of the gear wheels by circular plates attached to the concentric shafts, sliding shoes attached to loose ends of the spiral springs and projecting points set in the rims of the gear wheels to take hold of the sliding shoes and the loose ends of the spiral springs and, by winding them up, convey a gradually increasing rotation to the wind wheels and the centripetal propeller in order to facilitate starting the wind wheels and the propeller substantially as described.

4. A gearing device acting between lifting wind wheels and a centripetal propeller of an air ship, and in the said air ship the combination with an air plane of a pair of oppositely rotating wind wheels, supported on concentric shafts, mounted on the said air ship, each of the said wind wheels consisting of flat air chambers provided with projecting hollow teeth resembling the teeth of buzz-saws which advance against the air and scoop it up into the interior of the said wind wheels, whence it is driven downward, and discharged in a forward, slanting direction, and inside the said concentric shafts an inner supporting shaft rigidly mounted in the frame work of the air ship and carrying ball bearings, upon which revolve the inner concentric shaft and the upper wind wheel substantially as described.

ROBERT J. McLAUGHLIN.